Oct. 18, 1938.  G. W. HAWLEY  2,133,859
BONE SETTING
Filed March 31, 1938
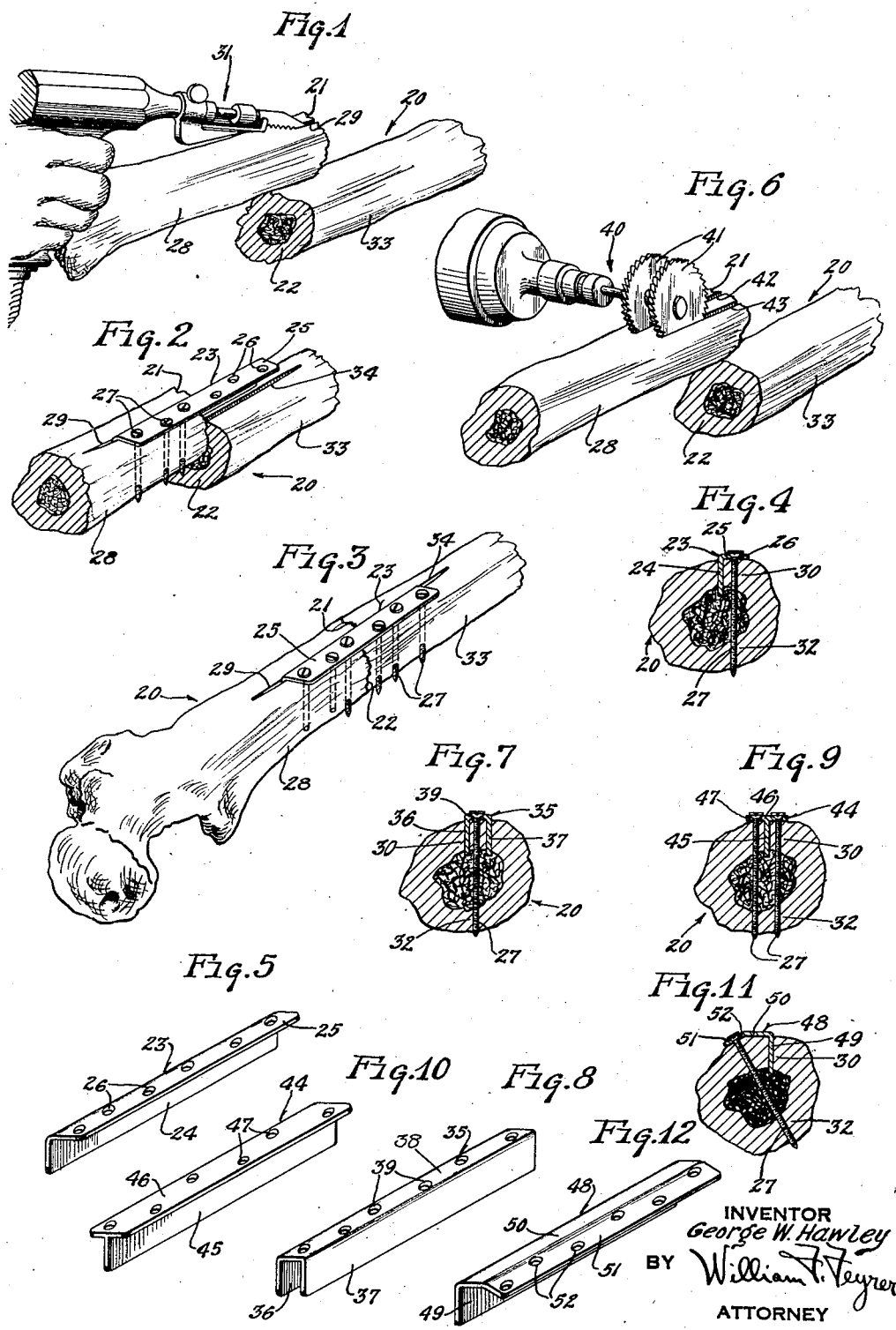
INVENTOR
George W. Hawley
BY William P. Veyrer
ATTORNEY Patented Oct. 18, 1938

2,133,859

UNITED STATES PATENT OFFICE 2,133,859

BONE SETTING

George W. Hawley, Westport, Conn., assignor to Louis J. Padula, doing business as Allied Medical & Orthopedic Supply Co., Norwalk, Conn.

Application March 31, 1938, Serial No. 199,067

15 Claims. (Cl. 128—92)

This invention relates to a bone plate and to a method of using the same.

Under certain conditions and with certain types of fractures it has been found desirable to set the fractured bone through the utilization of a bone plate actually secured to the bone.

As heretofore generally practiced the operation of setting a fractured bone with a bone plate involved the use of a single flat plate having holes therein for receiving screws. In applying the plate the fracture ends of the bone were aligned and the plate merely placed on the surface of the bone and secured thereto by screws at both sides of the fracture.

The prior bone plate and process have been used with reasonable success and in most cases have proved to be satisfactory. However, even when the prior plate and method were used by experts in the large medical centers there resulted occasional accidents of bent or broken bone plates. Also, with this prior plate and process an external immobilization, involving a cast and splints, was necessary.

It is an object of the present invention to provide an improved bone plate and method by which: the danger of bent or broken plates is reduced to a minimum; the fracture is more securely set so as to eliminate the necessity of external immobilization in the ordinary case; and an unusually strong fixation of the plate to the bone may be achieved.

In achieving this object there is provided as a feature of this invention a bone plate having an inlay flange which is inserted in preformed and aligned slots extending longitudinally of the fractured bone from the meeting ends thereof, and on which there is formed a surface section or plate disposed at an angle relative to the inlay flange and extending longitudinally thereof. This surface section thus serves not only to strengthen the entire bone plate against bending but serves also to support the inlay flange relative to the bone and to provide a means for receiving fastening elements, such as screws or nails, and directing them into the bone.

Because of the effective manner in which a fractured bone is set by the novel plate and method provided by the present invention the danger of the bone plate bending or breaking is reduced to a minimum and the healing of the fracture takes place more rapidly and with less inconvenience to the patient than with the prior plate and method used.

Another feature of the invention is to provide a bone plate which may be fixed to the fractured bone in an especially advantageous and effective manner.

To this end there is provided on the surface section of the bone plate provided by the present invention, means for receiving fastening elements and directing the same into the bone at an angle relative to the inserted inlay flange.

Other objects and features will appear hereinafter.

In the drawing:

Figure 1 is a fragmentary detail view showing the position of the bone fragments during the initial slotting operation.

Fig. 2 is a fragmentary detail view showing the bone plate secured to one of the bone fragments immediately prior to being inserted in the other bone fragment.

Fig. 3 is a view similar to Fig. 2 but showing the bone plate secured to both bone fragments.

Fig. 4 is a sectional view taken transverse of the bone and the bone plate.

Fig. 5 is a perspective view of the bone plate shown in Figs. 2, 3 and 4.

Fig. 6 is a view similar to Fig. 1 but showing a modified form of saw.

Fig. 7 is a sectional view similar to Fig. 4 but showing a modified form of the present invention.

Fig. 8 is a perspective view showing the bone plate illustrated in Fig. 7.

Fig. 9 is a sectional view similar to Fig. 4 but showing another modified form of bone plate.

Fig. 10 is a perspective view of the bone plate shown in Fig. 9.

Fig. 11 is a sectional view similar to Fig. 1 but showing a modified form of bone plate.

Fig. 12 is a perspective view of the bone plate shown in Fig. 11.

Before describing the present improvements and mode of operation thereof in detail it should be understood that the invention is not limited to the details of construction and arrangement of parts shown in the accompanying drawing, which is merely illustrative of the present preferred embodiments, since the invention is capable of other embodiments, and the phraseology employed is for the purpose of description and not of limitation.

When a bone 20 is broken, the fracture ends 21 and 22 thereof are displaced as shown in Figs. 1 and 2 so that they are no longer in aligned relation. To properly set such a fractured bone it is necessary to adjust the fracture ends so that they are in aligned and abutting relation. This may sometimes be accomplished with a closed reduction by externally manipulating the fracture. However, under certain conditions it is necessary to make an open reduction wherein an incision is made to expose the bone on its outer surface in order to properly line up the fracture ends and set the bone. It is for the treatment of fractures in which the doctor decides an operation or open reduction is necessary that the bone plate and method of the present invention are intended to be used.

Referring now more particularly to the drawing, and first to Figs. 1, 2, 3, 4 and 5, there is shown in Fig. 1 a fractured bone 20 with the fracture ends 21 and 22 in substantially the position they appear when the incision is made.

Now of particular importance there is provided by the present invention a bone plate 23 by which the fracture ends may be accurately and securely set. In its simplest form this novel bone plate 23 includes an inlay flange 24 and a surface section 25 angularly disposed relative to and extending longitudinally of the inlay flange. The bone plate therefore, in its simplest form, is in the form of an inverted L shape in cross section. Various suitable materials may be used in the construction of this bone plate but in the experiments to date stainless steel has proved to be very satisfactory. Metal alloys containing silver, because of the high germicidal properties of silver, are also satisfactory.

The surface section 25 serves not only to rigidify and strengthen the entire plate but also, as will hereinafter appear, serves to locate and support an inlay flange 24 relative to the bone and to provide a means whereby the plate may be easily fixed to the bone.

Formed in the surface section 25 and disposed longitudinally thereof are a plurality of holes 26 which, as shown, are preferably in staggered relation. This staggered relation of the holes prevents any tendency of the bone to split when fastening elements are inserted and more evenly distributes the stresses of compression and tension to which the bone may be subjected. These holes provide a means for receiving fastening elements, such as screws 27, and for directing the same into the fractured bone.

In the application of this novel bone plate 23 to a fracture and after the fracture ends are fully freed from the soft parts the following procedure has been found to be especially effective. One of the fragments 28 of the bone is marked for a longitudinal saw cut. The fracture end 21 of the fragment 28 is then lifted out of the wound and a slot 29 is cut through the proximal cortex 30 to extend longitudinally of the bone from the fracture end 21. Any suitable saw may be used for forming this slot but in practice it has been found that a small motor-operated reciprocating saw 31, see Fig. 1, is especially satisfactory.

While the fracture end 21 is lifted out of the wound one longitudinal half of the inlay flange 24 is inserted in the slot 29. Preferably, a relatively small drill point is then used to drill holes through the proximal and distal cortex 30 and 32 of the bone at points aligned with the holes 26 in the surface section 25. A relatively larger drill point is then used to drill holes only through the proximal cortex 30 next to the surface section. In this manner the holes produced in the proximal cortex 30 are slightly larger than the holes in the distal cortex 32. This is of importance in that when the screws 27 are inserted in the receiving and directing holes 26 the screws are loose in the proximal cortex next to the surface section and are threaded tightly only into the distal cortex. This makes for a more satisfactory and effective fixation of the bone plate 23 to the bone fragment 28.

After the bone plate 23 has been thus fixed to one of the bone fragments 28 the fracture end 22 of the other bone fragment 33 is manipulated so as to be brought into aligned and abutting relation therewith. A longitudinal mark is then made on the outside of this bone fragment 33, extending longitudinally thereof from the fracture end 22. The yet uninserted longitudinal half of the inlay flange 24 is used as a gauge to determine this mark. The bone fragment 33 is then moved to one side and a slot 34 cut therein similarly to the slot 29 in the other bone fragment 28.

After the second slot 34 is made the bone fragments or fractured sections 28 and 33 are then approximated, that is, the bone fragments are moved into aligned relation. This operation is made relatively simple because one half of the bone plate 23 is securely fixed to one of the bone fragments 28 and the yet uninserted half of the inlay flange 24 slips easily into the slot 34. This automatically locks the fracture ends and little effort is necessary to hold them in place.

After the fracture ends have been thus approximated, holes are drilled in the bone fragment 33 similarly to the holes drilled in the other bone fragment 28. The fracture ends 21 and 22 are then impacted one end against the other by pressure along the long axis of the bone and the final screws 27 are inserted in the bone fragment 33. If desired the ends of the screws may then be cut off with a suitable instrument and removed. However, by properly selecting the screws the need for this latter cutting operation may be eliminated. Upon the completion of the screwing operation the wound is closed and suitable dressings are applied.

In the manipulation of the two fractured sections it has been found that the most satisfactory results are obtained by using two bone clamps. One bone clamp is placed on the first slotted section having the bone plate secured thereto. Another bone clamp is placed on the second slotted section to hold the latter and to move it into alignment with the other section. The projecting end of the inlay flange is inserted in the slot. One of the clamps is then slid over to grip both of the fractured sections at the place of meeting. With the fractured sections thus securely clamped in aligned relation it is a relatively simple matter to insert the fastening elements in the second slotted section and thereby effectively and securely lock together the two fractured sections of the bone.

It is thus seen that the present invention provides a bone plate 23 which is particularly strong and yet which is technically easy of application and removal, should removal at any time be desired. Moreover, it will be readily appreciated that by inserting the inlay flange in slots preformed in the bone and by securing the plate to the bone by fastening elements, such as screws, inserted through receiving and directing holes in the surface section, there is achieved an unusually strong fixation of the plate to the bone. Moreover, the bone plate 23 holds the aligned and set bone fragments in an especially firm and secure manner.

If desired, and as shown in Figs. 6, 7 and 8 a slightly modified bone plate 35 and method may be utilized. This modified bone plate 35 differs from the bone plate 23 first described in the provision of a plurality of inlay flanges 36 and 37 instead of merely one inlay flange 24.

As shown most clearly in Fig. 8 this modified bone plate 35 is of substantially inverted U shape in cross section, and includes a pair of laterally spaced inlay flanges 36 and 37 connected by a surface section 38 which is angularly disposed relative thereto. As in the case of the bone plate 23 first described, the surface section 38 has formed therein a plurality of holes 39 disposed longitudinally thereof for receiving fastening elements, such as screws 27, and directing the same into the bone. Also, as in the bone plate first described, these holes 39 are preferably, and as shown, in staggered relation.

In the application of this modified bone plate a saw 40 such as shown in Fig. 6 may be used, including a pair of rotating discs 41, to simultaneously cut a pair of substantially parallel slots 42 and 43 in each of the fractured sections 28 and 33. However, a reciprocating saw 31 such as shown in Fig. 1 may be used equally well and may be preferred by certain experts.

The procedure of first securing the bone plate to one of the bone fragments and then subsequently cutting the other bone fragment and securing the bone plate thereto, described in connection with the bone plate 23 first described, is likewise preferred in connection with the modified bone plate 35. In the application of the modified plate, however, a pair of substantially parallel slots 42 and 43 are formed in each of the fractured sections 28 and 33 instead of only a single slot in each of the fractured sections as in application of the bone plate 23. The aligning of the fractured sections, drilling of the holes and the insertion of the screws is exactly the same as in the case of the bone plate heretofore described.

As shown in Figs. 9, and 10 a further modified plate 44 may be utilized. This modified plate is most similar to the plate shown in Figs. 2, 3, 4 and 5 and includes an inlay flange 45 and a preferably integral surface section 46. Instead of being formed of substantially inverted L shape in cross section, however, this modified bone plate is formed of a T shape in cross section. By thus forming a bone plate of T shape rather than inverted L shape, holes 47 for receiving and directing the screws 27 or other fastening elements into the bone may be provided in the surface section on opposite sides of the inlay flange. This permits a more exaggerated staggering of the screws which are disposed longitudinally of the surface section and serves to more evenly distribute the stresses set up in the bone and the plate when the bone is placed under either tension or compression. The application of the modified bone plate 44 to the bone is exactly the same as in the case of the bone plate 23 shown in Figs. 3, 4 and 5.

To provide a bone plate which may be fixed to the fractured bone in an especially advantageous and effective manner a modified bone plate 48, shown in Figs. 11 and 12, may be utilized. This modified bone plate 48, like the bone plate 23 shown in Figs. 2, 3, 4 and 5 is of substantially inverted L shape in cross section and includes an inlay flange 49 and a surface section 50.

However, in this modified plate 48 there is provided on the surface section 50, a portion 51 which extends longitudinally thereof and is angularly disposed relative thereto and in which are formed holes 52 for receiving fastening elements such as screws 27 or nails. Thus, when this modified bone plate 48 is inserted in preformed slots in a fractured bone the holes 52 direct the fastening elements 27 into the bone at an angle relative to the inlay flange 49. Any tendency of the bone plate 48 to pull out of the bone, therefore, is resisted not only by forces extending longitudinally of the fastening elements but also by forces which are transverse of the fastening elements.

The application of the modified bone plate to a fracture may be exactly the same as the application of the bone plate 23 shown in Figs. 2, 3, 4 and 5.

While the provision of an angularly disposed portion 51 on the surface section 50 for directing fastening elements 27 into the bone at an angle relative to the inlay flange has been shown only in connection with a bone plate of inverted L shape in cross section, such a portion might be equally well applied to bone plates of either T or inverted U shape in cross section.

While the bone plates have been illustrated as of substantially the same size it will be appreciated that in actual practice the bone plates will be made of different sizes for use with different bones. Thus, it has been found that one size of plate may be used for femur and tibia, weight-bearing bones, one size for the humerus, and one size for the radius and ulna.

Also, as illustrated, the bone plates are formed with six holes, three holes for receiving screws for each of the bone fragments. However, more or less holes may be utilized if from the nature of the operation being performed a change in the number of holes utilized is deemed advisable.

Moreover, while as illustrated the screws 27 are inserted completely through the bone, it is within the purview of the invention to so drill the holes and to so select the fastening elements that the end of the fastening elements will be slightly covered by the outer section of the distal cortex.

Variations and modifications may be made within the scope of this invention and portions of the improvements may be used without others.

Having thus described the invention, what is claimed as new is:

1. A bone plate, for setting a fractured bone having preformed and aligned slots at the meeting ends thereof, comprising an inlay flange; and means on said plate for limiting movement of said inlay flange into the aligned slots.

2. A bone plate, for setting a fractured bone having preformed and aligned slots at the meeting ends thereof, comprising an inlay flange; means on said plate for limiting movement of said inlay flange into the aligned slots; and means for securing the inlay flange to the bone.

3. A bone plate for setting a fractured bone, comprising a surface section adapted to be placed on the exterior of the bone and to extend longitudinally thereof across the meeting ends of the fractured bone; an inlay flange integral with and disposed at an angle relative to said surface flange for insertion in preformed and aligned slots extending from the meeting ends of the fractured bone.

4. A bone plate for setting a fractured bone, comprising a surface section adapted to be placed on the exterior of the bone and to extend across the meeting ends of said fractured bone, said section having holes formed therein in staggered relation for receiving and directing fastening elements into said bone; and an inlay flange disposed at an angle relative to said surface section for insertion in preformed and aligned slots extending from the meeting ends of said fractured bone.

5. A bone plate for setting a fractured bone, comprising an inlay flange for insertion in preformed and aligned slots extending longitudinally of the fractured bone from the meeting ends thereof; means for resisting bending of said inlay flange and for supporting the latter relative to said bone when inserted in said slots; and means on said supporting means for receiving fastening elements and directing the same into said fractured bone.

6. A bone plate for setting a fractured bone, comprising an inlay flange for insertion in preformed and aligned slots extending longitudinally of said fractured bone from the meeting ends thereof; a surface section connected to and angularly disposed relative to said flange, extending longitudinally thereof and adapted to be placed upon the exterior of the fractured bone and to extend across the meeting ends; and means on said surface section for receiving fastening elements and directing the same into said bone at an angle relative to said flange.

7. A bone plate for setting a fractured bone, comprising an inlay flange for insertion in preformed and aligned slots extending longitudinally of said fractured bone from the meeting ends thereof; a surface section connected to and angularly disposed relative to said flange, extending longitudinally thereof and adapted to be placed upon the exterior of the fractured bone and to extend across the meeting ends; and a longitudinally extending portion on said surface section and angularly disposed relative thereto, having holes therein for receiving fastening elements and directing the same into said bone at an angle to said flange.

8. A bone plate for setting a fractured bone, comprising a pair of laterally spaced inlay flanges for insertion in preformed and aligned slots extending longitudinally of said fractured bone from the meeting ends thereof; a surface section connecting said pair of inlay flanges and angularly disposed relative thereto, adapted to be placed upon the exterior of the fractured bone and to extend longitudinally across the meeting ends; and means on said surface section, intermediate said inlay flanges, for receiving fastening elements and directing the same into said bone.

9. A bone plate for setting a fractured bone, comprising an inlay flange for insertion in preformed and aligned slots extending longitudinally of said fractured bone from the meeting ends thereof; a surface section connected to and angularly disposed relative to said flange, extending longitudinally thereof and adapted to be placed upon the exterior of the fractured bone and to extend across the meeting ends; portions on said surface section extending laterally to opposite sides of said inlay flange; and means on said portions for receiving fastening elements and directing the same into said fractured bone.

10. A bone plate for setting a fractured bone, comprising an inlay flange for insertion in preformed and aligned slots extending longitudinally of said fractured bone from the meeting ends thereof; and means angularly disposed relative to said inlay section for supporting said inlay flange relative to said bone when the latter flange is inserted in said slots, said means having holes formed therein for receiving fastening elements and directing the same into said fractured bone.

11. A bone plate for setting a fractured bone, comprising an inlay flange for insertion in preformed and aligned slots extending longitudinally of said fractured bone from the meeting ends thereof; means for supporting said inlay flange relative to said bone when the latter flange is inserted in said slots, said means being provided with holes for receiving fastening elements and directing the same into said fractured bone, and said means being so disposed relative to said inlay flange that fastening elements inserted in said holes will be directed at an angle relative to said inlay flange.

12. A method of setting a fractured bone having at least two bone fragments by a bone plate having an inlay flange and a surface section angularly disposed relative thereto, including the steps of forming slots in the two bone fragments to respectively extend longitudinally thereof from the fracture ends; inserting said inlay flange in said slots to align said bone fragments and to place said surface section closely adjacent the exterior of the bone; and inserting fastening elements through the surface section and into the bone fragments.

13. A method of setting a fractured bone which comprises the steps of severing the skin and flesh at both sides of the fracture to expose the outer surface of both sections of the fractured bone; forming aligned slots in the meeting fractured sections of the bone, for receiving an L-shaped bone plate with integral inlay and surface sections; placing the inlay flange of said bone plate into said aligned slots until the surface section thereof engages the exposed outer surface of the bone; and driving securing means through the surface section of the plate and into the fractured sections of the bone.

14. A method of setting a fractured bone which comprises the steps of severing the skin and flesh at both sides of the fracture to expose the outer surface of both sections of the fractured bone; forming pairs of aligned slots in the meeting fractured sections of the bone, for receiving a U-shaped bone plate with integral inlay sections and a surface section; placing the inlay flanges of said bone plate into said aligned pairs of slots until the surface section thereof engages the exposed outer surface of the bone; and driving securing means through the surface section of the plate and into the fractured sections of the bone.

15. A method of setting a fractured bone which comprises the steps of exposing the outer surface of both sections of the fractured bone; forming a slot in one of said sections, extending longitudinally from the fracture end thereof, for receiving a longitudinal portion of a bone plate having angularly disposed inlay and surface sections; placing one longitudinal portion of the inlay flange of said bone plate into said slot until the surface section thereof engages the outer surface of the fractured section; driving securing means through one longitudinal portion of said surface section into said slotted fractured section; aligning said unslotted fractured section with said slotted fractured section; marking a coextensive aligned slot area on said unslotted fractured section; forming a slot in said previously unslotted fractured section in the marked area; placing the other longitudinal portion of said inlay flange in said slot in said last slotted fractured section until the surface section of the bone plate engages the outer surface of said fractured section; and driving securing means through the surface section of said plate and into said last slotted fractured section.

GEORGE W. HAWLEY.